United States Patent [19]

Adamson, Jr.

[11] 3,971,933
[45] July 27, 1976

[54] QUICK DISCONNECT FOR NIGHT VISION OPTICS

[75] Inventor: James R. Adamson, Jr., Alexandria, Va.

[73] Assignee: The United States of America as represented by the Secretary of the Army, Washington, D.C.

[22] Filed: June 18, 1975

[21] Appl. No.: 588,091

[52] U.S. Cl. .......................... 250/213 VT; 250/330; 313/51; 339/88 C
[51] Int. Cl.² ........................................ H01J 31/50
[58] Field of Search ......... 250/213 VT, 213 R, 330, 250/333; 313/51, 94, 103, 318, 401; 339/46, 88 R, 88 C

[56] References Cited
UNITED STATES PATENTS

| 3,454,773 | 7/1969 | Bulthuis et al. ................. 250/333 X |
| 3,787,688 | 1/1974 | Stone ........................... 250/213 VT |
| 3,787,693 | 1/1974 | Stone ............................... 250/330 |
| 3,812,357 | 5/1974 | Flogaus et al. ................. 250/330 X |

Primary Examiner—Eugene La Roche
Attorney, Agent, or Firm—Nathan Edelberg; John E. Holford; Robert P. Gibson

[57] ABSTRACT

The invention provides a quick disconnect device for use between image intensifier tubes and their power supply or their supporting apparatus.

4 Claims, 5 Drawing Figures

QUICK DISCONNECT FOR NIGHT VISION OPTICS

The invention described herein may be manufactured, used, and licensed by or for the Government for governmental purposes without the payment to me of any royalty thereon.

BACKGROUND OF THE INVENTION

Image intensifier tubes are employed in a number of night vision devices and in commercial processing equipment as well. In order to operate properly it is usually required that the tube axis be firmly and accurately aligned with the optical axis of lens systems, detectors or the eyes of a human being, even through the entire system may be subjected to severe shocks while in use. A case in point is a pair of night vision goggles or binoculars which employs two such tubes. The lens systems are mounted directly on the tubes and an assembly head frame mounts the tubes and their power supply on the observers head. A pocket scope which uses the same tube and lenses has only a battery mounted on it. Numerous systems have been built around such tubes and, in fact, the number of models of these tubes has been greatly minimized through standardization. It is therefore, desireable that any mounting means that is more less permanently attached to one of these tubes should likewise be adapted for use in many other systems.

BRIEF DESCRIPTION OF INVENTION

The primary object of this invention is to provide a reliable quick-disconnect mount for the image intensifier tube in night vision goggles.

A further object is to provide a mount as described above which can be used on pocketscopes and other types of low light level and night viewing devices than the aforementioned binoculars.

BRIEF DESCRIPTION OF THE DRAWINGS

The invention is best understood with reference to the attached drawings wherein.

DESCRIPTION OF THE INVENTION

Figure 1:
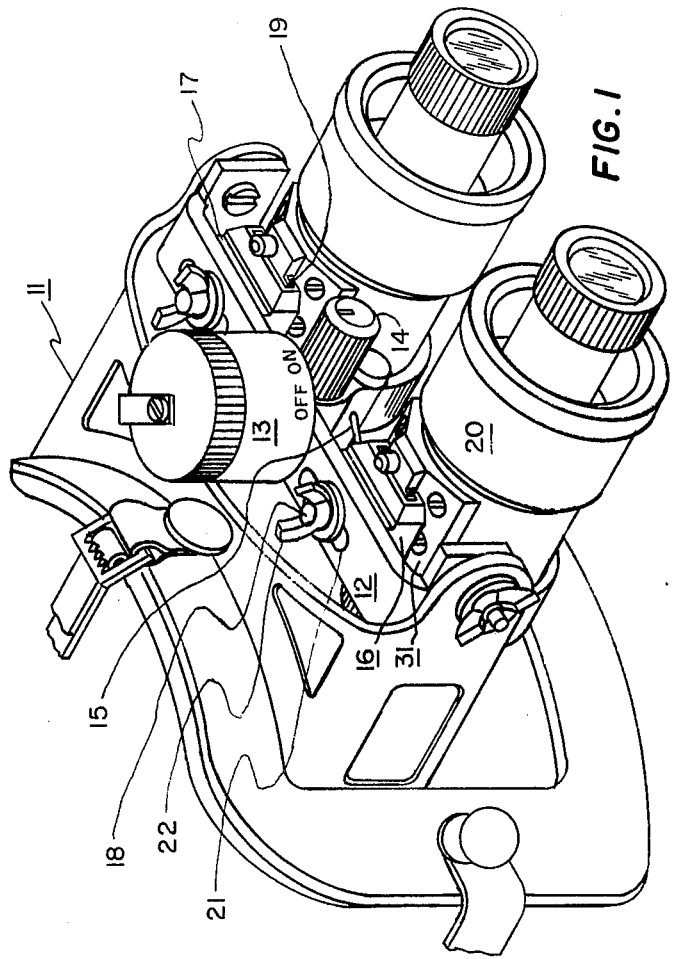
FIG. 1 shows a pictorial view of a pair of connectors according to the present invention on a pair of night vision goggles.

Referring specifically to FIG. 1 there is shown a pair of night vision goggles used, at present, chiefly by vehicle operators. The user dons a head assembly frame 11 which includes a channel type support bar 12. The latter extends across the forehead of the user and carries a power supply 13, usually a battery carrier and battery. Suitable battery carriers have been developed for such applications, which are easily manipulated with one hand so that a vehicle operator can change batteries in a matter of seconds without removing the head assembly frame. An on-off switch 14, is mounted under the battery carrier, both being centrally located for convenience. Two leads 15 may extend from the switch, each to one of a pair of female couplings 16 located on the mounting bar. Each female coupling is slideably mounted on the support bar and provided with a clamping means, e.g. wing nut 22 which engages a threaded post member 18 projecting from the coupling through a slot 21 in the mounting bar. A tang 17 on the top of the coupling below post 18 maintains it in fixed alignment with the channel bar.

An image intensifier 20 is connected to a male coupling 31 which mates with coupling 16. In the past it has been the practice to form the couplings from parts that snap together by applying force vertically between the parts, i.e. normal to the optical axis of the intensifier 20 and the support bar 12. This required both of the operator's hands and was awkward due to the vertical and rotational movements required of the intensifier unit. To avoid this in the present invention, the coupling unit is made of two specially designed members to form a simple bayonet coupling 19 which can be assembled and disassembled quickly and surely with one hand.

Figure 2:
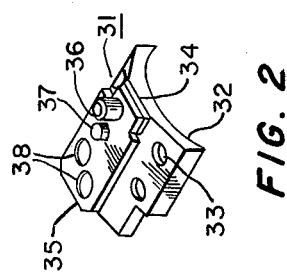
FIG. 2 shows a separate pictorial view of the male portion of the connector in FIG. 1.

FIG. 2 shows the general construction of an improved male coupling member 31, for use in element 19 in FIG. 1. The lower saddle 32 conforms to the contour of the image intensifier, and may be attached thereto by screws through holes 33. A spacing ridge 34 projects from the saddle and is topped by a thinner flange 35. The latter tapers from the width of the ridge at its end near the operator to a greater fixed width that runs along the central section of the ridge portion to define an external portion of the male member. The tapered edges can be further chamfered, if desired, to facilitate mating. A release button 36, a detent button 37 and male contacts 38 are added to the structure, in inverse order from the operator's end, in a manner to be described in FIG. 4.

Figure 3:
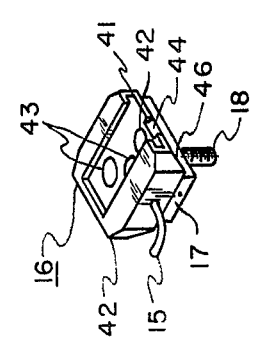
FIG. 3 shows a pictorial view of the female portion of the connectors in FIG. 1.

FIG. 3 shows the construction of a female member 16 to mate with element 31 in FIG. 2. This member includes a lower socket 42 that is large enough to contain a T-shaped slotted recess 41 for the wide and tapered portions of the flange. The narrow part of the flange extends out of the end thereof furtherest removed from the operator. Electrical spring contacts 43 are mounted in the slotted recess and connected to leads 15 from FIG. 1, the latter passing through holes drilled through the coupling member (not shown). Contacts 43 and 38 are spaced longitudinally and laterally to avoid obvious unwanted interactions. A detent recess 42 is also provided in the slotted recess; the detent recess and contacts being positioned to engate the complementary elements of the male member in the usual manner well understood by those skilled in the art. The threaded post member 18, from FIG. 1, is mounted on the coupling member with the tang 17 as described previously. Both the male and female members can be made of plastic material to avoid electrical problems or metal can be used with the usual insulation and weather proofing precautions being observed for the leads and contacts. A ramp 44 may be cut into the recess to automatically depress the detent button 37 during coupling. A sloping face 46 above recess 41 guides the user's finger to release button 36 for decoupling.

Figure 4:
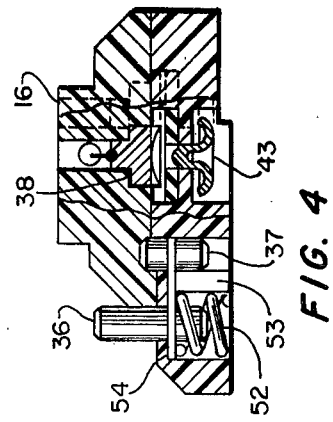
FIG. 4 shows an edge view of the male and female portions of the connectors of FIG. 1 in mated position and sectioned to show the detail of a detent locking mechanism.

FIG. 4 shows a sectional view of the male member 31 from FIG. 2. The cylindrical release and detent buttons 36 and 37 may have essentially the same structure. The flange and ridge are drilled to receive the buttons with vertical slideability along their axes. When the saddle 32 in place the button is restricted in downward movement. A slot 53 is also provided in the ridge between buttons. A piece of stiff piano wire is connected between the two buttons, extending through slot 53, to coordinate their movements, and a compressed coil spring 52 placed between release button 36 and the saddle 32 forces both buttons into an upper limiting position through the flange 35 in the absence of external forces. The two spring arrangement insulates the movements of the two buttons so that the friction between detent button and its recess will tend to delay its disengagement. Thus momentary accidental depressions of button 36 will not necessarily result in release of an intensifier.

The resulting unit is easily manipulated with one hand since optical alignment is maintained during the entire mating operation. This and the speed at which it may be accomplished is important should the viewer fail at a critical point or should the operator need to return suddenly to normal vision.

Figure 5:
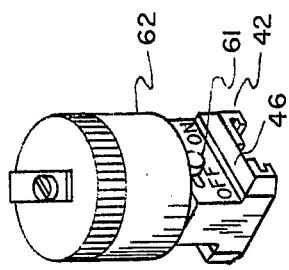
FIG. 5 shows a female adapter for use with one image intensifier tube from the goggles in FIG. 1.

FIG. 5 shows an adapter that can be substituted for the female coupling 16 of FIG. 3. Instead of the tang 17, threaded post 18 and lead 15; a switch 61 and battery carrier 62 are mounted directly on the female coupling. The remainder of the female coupling is identical to the FIG. 3 embodiment and by making elements 17 and 18 in a separate detachable unit the remaining part can be used interchangeably. When placed on an intensifier having a male coupling as in FIG. 2 a simple hand held imager is provided. When the FIG. 5 arrangement is rigidly attached to a weapon in a boresighted configuration the intensifier becomes a gunsight. Suitable optics and reticles are currently available for such applications.

Many variations of the above structure will be immediately obvious to those skilled in the art but the invention is limited only as defined in the claims which follow.

I claim:

1. An image intensifier which converts a low light light level (invisible) image to a visible image comprising:
   a support member including;
     an electrical power source attached to said support member having at least one electrical terminal,
     a female bayonet socket, also attached to said support member, and
     at least one resilient electrical contact mounted in said socket connected to said one terminal,
   an optical unit mated to said female socket including;
     an electrical image intensifier tube,
     a lens means mounted on said tube to focus at least the invisible image in said intensifier tube,
     a male bayonet member complimentary in shape and mated with said female member rigidily attached to said tube and lens means, and
     a rigid electrical contact mounted on said male member oriented to press on said resilient contact as said male and female members are mated.

2. An image intensifier according to claim 1 wherein said power source comprises a battery holder and a battery.

3. An image intensifier according to claim 1 wherein said support member further includes;
   an assembly head frame attached thereto;
   said power source is rigidly attached to said frame; and
   said female socket being slideably attached to said frame for adjustment of the interpupillary distance.

4. An image intensifier according to claim 1 wherein:
   said male member includes an external portion when mated with said female member;
   a spring loaded release button is mounted in said external portion and projecting therefrom;
   a detent recess is formed in said female member close to said external portion in the mated position;
   a slideably mounted detent button mounted in said male member positioned to engage said detent recess in the mated position; and
   a stiff spring member couples said release button and said detent button.

* * * * *